April 27, 1926.

F. L. SESSIONS

ELECTRIC WELDING MACHINE

Filed April 1, 1922 4 Sheets-Sheet 1

INVENTOR:
Frank L. Sessions

April 27, 1926.

F. L. SESSIONS

ELECTRIC WELDING MACHINE

Filed April 1, 1922     4 Sheets-Sheet 4

INVENTOR:
Frank L. Sessions

Patented Apr. 27, 1926.

1,582,549

UNITED STATES PATENT OFFICE.

FRANK L. SESSIONS, OF LAKEWOOD, OHIO, ASSIGNOR TO THE ELYRIA IRON & STEEL COMPANY, OF CLEVELAND, OHIO, A CORPORATION OF OHIO.

ELECTRIC WELDING MACHINE.

Application filed April 1, 1922. Serial No. 548,752.

*To all whom it may concern:*

Be it known that I, FRANK L. SESSIONS, a citizen of the United States, residing at Lakewood, in the county of Cuyahoga and State of Ohio, have invented certain new and useful Improvements in Electric Welding Machines, of which the following is a specification.

My invention relates to electric welding machines and particularly to that class of electric welding machines used for progressively welding a longitudinal, butted-seam in metal tubing.

Among the objects of my invention are the provision of an electrode of annular cross section such for instance as a cylinder, drum, or cone, adapted to make edge contact with the work; the provision of an electrode that does not change its diameter during its useable wearing life; the provision of an electrode having a large amount of wearing material available for contact with the work thus making a long life electrode; the provision of means for cooling the electrode; the provision of means for scraping the work-contacting surface of the electrode; the provision of an electrode-scraping tool supported by the structure which carries the electrode and which is movable therewith; the provision of means for supporting the electrode-scraping tool electrically connected to the electrode with which the tool is in contact; the provision of separate feeding-means for positioning the scraping tools relative to the electrodes; the provision of detachable means connecting the tool-feeding-means whereby the tools may be adjusted simultaneously or independently; the provision of electrodes that can be readily and separately removed from the welding machine; the provision of electrodes having a maximum amount of useful wearing material; and the provision of means for dressing the electrodes without removing them from the machine. I accomplish the foregoing and other objects by the use of the structure described in this specification and shown in the accompanying drawings in which—

Fig. 1 is drawn to a somewhat smaller scale than the other figures.

In electric tube welding machines with which I am familiar the tube which is to be welded is formed from flat metal strip into butted-seam tube, the seam running longitudinally of the tube. The customary operations to be performed upon the metal strip for producing an electrically welded tube are, the forming of the strip into butted-seam tubing; the welding of the seam; the removal of the welding burr from the welding seam known as the "deburring" operation; the cooling of the welded tube; the straightening of the tube; and the cutting-off of the tube. In some practices these various operations are performed in separate machines while in other practices various ones of the operations are combined in a single machine. As my invention relates particularly to the welding operation and the means for performing it, I have shown in the drawings and shall describe herein in detail only those parts of the machine which are pertinent to my invention.

The machine illustrated is adapted to weld preformed, butted-seam tube whether the forming operation be performed by mechanism embodied in the welding machine or by a separate machine. In the drawings, 1 represents the base of the welding machine which, as illustrated, is provided with a pair of power driven tube feeding rolls, 2, 2, and a pair of power driven "take-off" rolls, 3, 3, carried by suitable shafts, 5, 5, rotatably mounted in adjustable bearings, 4, 4. The shafts, 5, 5, of the feed and take-off rolls may have gears mounted upon them, the gears being of the same pitch diameter as the effective diameter of the rolls and the shafts may be driven by any suitable means such for instance, as the driving gears, 6, which may be connected to any suitable source of power. The base, 1, carries a vertical, sliding support which in the machine illustrated in the drawings consists of four metal posts, 7, secured in socket apertures, 8, formed in the base member, 1, or suitable brackets secured thereto.

The vertical guide posts, 7, are secured at their upper ends to a head frame, 9. An electric welding transformer, 10, of known character and construction is mounted for vertical sliding movements upon the guide posts, 7, by means of sliding bearings, 11, the weight of the transformer being supported from the head frame, 9, by any suitable hoisting means such as the chain hoist, 12. The position of the transformer and consequently the pressure of the electrodes upon the tube may be regulated by the jackscrews, $12^a$, which are threaded into collars, $12^b$, fixed upon posts, 7, and limit the downward movement of the transformer. The transformer comprises the usual primary coil, 13, receiving current from any suitable source through wires, 14, 15; and the secondary coil, 16, which in the transformer shown in the drawings is preferably made a hollow copper casting adapted to contain the primary coil which is insulated from the secondary. The secondary of the transformer illustrated has only one turn, the terminals, 17 and 18, of the secondary being insulated from each other by means of a plate, 19, of insulating material. 20 represents the laminated, iron core of the transformer which is preferably insulated from the secondary, 16, by means of insulating material such as that shown at 21, 22, 23 and 24. Core clamping plates, 25, and 26, are provided and they are preferably insulated from the core by means of insulating material such as that shown at 27.

In the transformer shown in the drawings the core clamping plates, 25 and 26, together with clamping bolts, 28, constitute the mechanical frame of the transformer. The secondary, 16, may be secured to the plate, 26, by means of insulated bolts, 29.

Directly below the transformer, 10, and supported by the bed plate, 1, are the tube-supporting, side-pressure rolls, 30, which are free to rotate upon studs, 31, carried by adjustable members, 32, which are adapted to slide transversely of the machine between suitable guides, 33, 34, upon the base, 1, and which are adjustable transversely of the machine and of the tube being welded by means of a right and left hand threaded rod, 35, and set screws, 36. Each of the members 32, is threaded or has attached to it a threaded nut, one right hand and one left hand, so that when the rod, 35, is rotated the blocks, 32 and consequently the rolls, 30, will be moved toward or away from each other. The set screws, 36, which are threaded through brackets, 37, secured to the base of the machine are provided with cone points adapted to enter lathe-center holes in the ends of rod, 32, and by loosening one of the screws, 36, and tightening the other, both of the blocks, 32, and both of the rolls, 30, may be adjusted simultaneously, in the same direction transversely of the machine and of the tube being welded. It is important that the tube seam-cleft be positioned midway between the electrodes. The cross adjustment of the side pressure rolls accomplishes this positioning of the seam-cleft.

The electrodes, 38, which I prefer to use are of annular cross section, preferably cylindrical, drum or conical, as distinguished from the disc form of electrodes heretofore known, and may be of any convenient, axial length. I prefer to make them similar in construction to that of a cast metal pulley having a rim, $38^a$, of annular cross section, a web or spokes, 39, and a hub, 40. It will be observed that the opposed, outer surfaces of the electrodes which rise above the work are parallel in the plane of the welding throat and that vertical movements of the electrodes do not alter the distance between these opposed surfaces or between either of them and the seam cleft. In other words, the outer surface of each electrode may be said to be generated by the revolution of a straight line about the axis of the electrode and the generating lines or elements of the opposed surfaces of the two electrodes are parallel in a plane passing through the welding throat transverse to the seam cleft. It will be observed that when so constructed the electrodes may be either cylindrical or conical and that the distance between them in the plane of the welding throat will not be altered by their wearing away or by having their edges trued up. The electrodes are shown as freely revoluble about their axes and while they may be supported by various means I prefer to support them by ball bearings, 41, upon studs or trunnions, 42. I prefer to provide apertures in the secondary terminals, 17 and 18, of the transformer for the reception of the studs or trunnions, 42, and to make the portions, $42^a$, of the studs, which fit in the apertures in the transformer terminals eccentric to the portions which carry the electrode bearings, so that, by turning the studs, 42, in the apertures in the transformer secondary terminals, the electrodes may be adjusted toward or away from each other. To effect this adjustment the stud portions, $42^a$, are preferably externally threaded and have squared ends, $42^b$. Either of studs, 42, may thus be turned in its aperture in one of the transformer secondary terminals by means of a wrench applied to the squared end of the stud and, when adjusted to the proper position, it may be secured in that position by tightening the nuts, 43.

To conduct current from the secondary of the transformer to the revolving electrodes, brushes, 44, mounted in suitable adjustable brush holders, 45, or any other suitable current collecting means may be employed. For supporting the electrodes, 38, upon the studs, 42, threaded nuts, 46, may be employed, they being preferably threaded upon the ends of studs, 42, and bearing against the inner races of the lower ball bearings, 41. For removing and replacing the electrodes from the studs, 42, the transformer, 10, should be raised high enough to permit the electrodes to be lowered off from the studs, and the nuts, 46, should be removed, after which the electrodes, 38, and the ball bearings, 41, may be lowered away from the studs, 42, and be removed from and replaced upon the machine.

For lubricating the bearings of the electrodes I prefer to provide apertures such as those shown at 47 in the studs, 42, through which apertures oil or grease may be applied directly to the bearings, 41. It will be noted that any excess oil or grease that runs down through the lower electrode bearing may drip down to the bed of the machine without striking the tube which is being welded.

For cooling the electrodes I prefer to provide means such as the pipes, 48, which may be connected to any suitable water supply and conduct water to the tops of the electrodes which are preferably provided with recesses, 49, adapted to contain a supply of water but which are open at the top to permit the cooling fluid to overflow and run down the sides of the electrodes thereby cooling their sides and lubricating the current collecting brushes when such brushes are employed.

The lower edges of the electrode rolls are grooved as shown at 50 to make contact with the tube which is being welded and the supporting and side pressure rolls, 30, are also grooved to suit the tube. Together the grooves in the supporting and side pressure rolls and the electrode rolls form a welding throat the cross section of which is substantially a closed curve, substantially a circle, made up of complemental grooves including those formed in the electrodes. It will be observed that the groove in the electrode is formed in the outer, lower edge of the cylindrical portion, the groove being partly in the face and partly in the end of the electrode. It will be understood that the welding throat may be made other than circular in cross section, for instance, oval or elliptical or other shape.

The tube which constitutes the work to be welded is shown at 51, the seam cleft being at the top and midway between the opposite electrodes. The electrodes contact upon the opposite sides of the seam cleft but it will be observed that they are both disposed on the same side of the work, so that they may be moved simultaneously in one direction (downward when arranged as shown in the drawings) towards the work and in opposite direction (upward when arranged as shown in the drawings) away from the work. They are preferably spaced apart about an eighth of an inch so that they cannot run over the seam cleft, which may be accurately guided by known means to maintain it always midway between the electrodes.

In welding a tube the butted-seam tube is fed into the machine through the feed rolls 2, and, as it passes through the welding throat current passes from one electrode across the seam to the other electrode. Simultaneously, the side pressure rolls force the edges of the seam cleft together so that under the welding heat developed by the passage of the current across the seam cleft the edges of the tube are welded together. The tube after passing through the welding throat passes through the "take-off" rolls, 3, these rolls being adapted to continue to feed or traverse the tube through the welding throat after the end of the tube has passed through and out of contact with the feed rolls, 2.

Other means than the feed rolls, 2, and take-off rolls, 3, may be employed for traversing the tube through the welding throat. In instances where the tube is formed by forming rolls combined with the welding machine, the forming rolls may be relied upon to traverse the tube through the welding throat.

In case the deburring tool, straightening and cut-off mechanisms, or any of them, are embodied in the same machine that does the welding it will be understood that they may be so constructed and located as to best perform their functions.

As the tube passes through the welding throat the metal bordering the seam cleft is heated to incipient fusion so that the surface of the tube for a limited distance on either side of the seam cleft may rapidly oxidize and does sometimes oxidize and adhere to the contacting surfaces of the electrodes. When metal particles, particles of metal oxide or other foreign particles thus adhere to the contacting surfaces of the electrodes they tend to destroy the electrical contact between the electrodes and the tube, or, at least, to increase the electrical resistance of the contact and injure the quality of the weld or burn or score the surface of the tube, in either case making a defective product.

To remove such adhering particles I prefer to provide electrode scraping tools such as those shown at 52, having cutting edges of the proper contour to fit the contour of the contacting surfaces of the electrode. These tools are adapted to continually bear against those contact surfaces, to scrape off any adhering particles and to continually lightly dress the contacting surfaces to maintain their proper contour and present them always bright and clean to the tube with which they contact.

As it is necessary to regulate the vertical pressure of the electrodes upon the tube by adjusting the height of the transformer in which structure the electrodes have their bearings, I prefer to support the scraping tools, 52, in suitable tool holders, 53, and horizontal and vertical tool feeding slides, 54 and 55, carried by the transformer structure. When so supported, vertical adjustments of the electrodes do not affect the tool adjustments as the tools are raised and lowered with the electrodes. After having once been set in proper relation transversely of the tube it is seldom necessary to change the transverse adjustment but it is frequently necessary to change the vertical adjustment of the tools to compensate for the wearing of the electrodes by friction with the tube, the burning off of the electrode by the intense heat at the welding throat and the continual dressing of the electrodes by the scraping tools. I prefer therefore to make the vertical adjusting means for the tools operable either independently or simultaneously. To effect these adjustments one of the vertical adjusting screws, 56, may have mounted upon it and permanently secured to it a sprocket, 57, while the other vertical adjusting screw, 58, may have mounted upon it a sprocket, 59, which is free to rotate upon the shank, 60, of the screw, 58, but which may be engaged by a friction clutch member such as the cone, 61, forming part of the hub of the hand wheel, 62, which is keyed to the shank, 60, against rotation but which is free to slide thereon. The sprocket, 59, being provided with a complemental clutch member such as an internal cone surface to fit the external cone, 61, the hand wheel, 62, may be put into driving connection with adjusting screw, 58, by forcing the hand wheel, 62, into contact with it. This may be accomplished by means of a knurled nut, 63, threaded upon the end of shank, 60, in a well known manner. A suitable, flexible sprocket-chain or chain-belt, 64, may be provided for connecting sprockets, 57 and 59. The flexible member, 64, should be made of insulating material, or, at least should have insulating sections in it so as not to short circuit the electrodes through the tools, their supports, the adjusting screws and the flexible member, 64. Such insulating sections are indicated at 65.

The vertical slide supports, 66 and 67, for the scraping tools are shown bolted directly to the transformer secondary terminals, 17 and 18, respectively. It will be understood that instead of being bolted to the transformer secondary terminals, 17 and 18, the tool supports, 66, and 67, may be secured to but insulated from the frame, 26, of the transformer. Or the tool supports may not be insulated from the frame but the tools themselves may be insulated in their holders in well known manner.

Figures 2, 10:
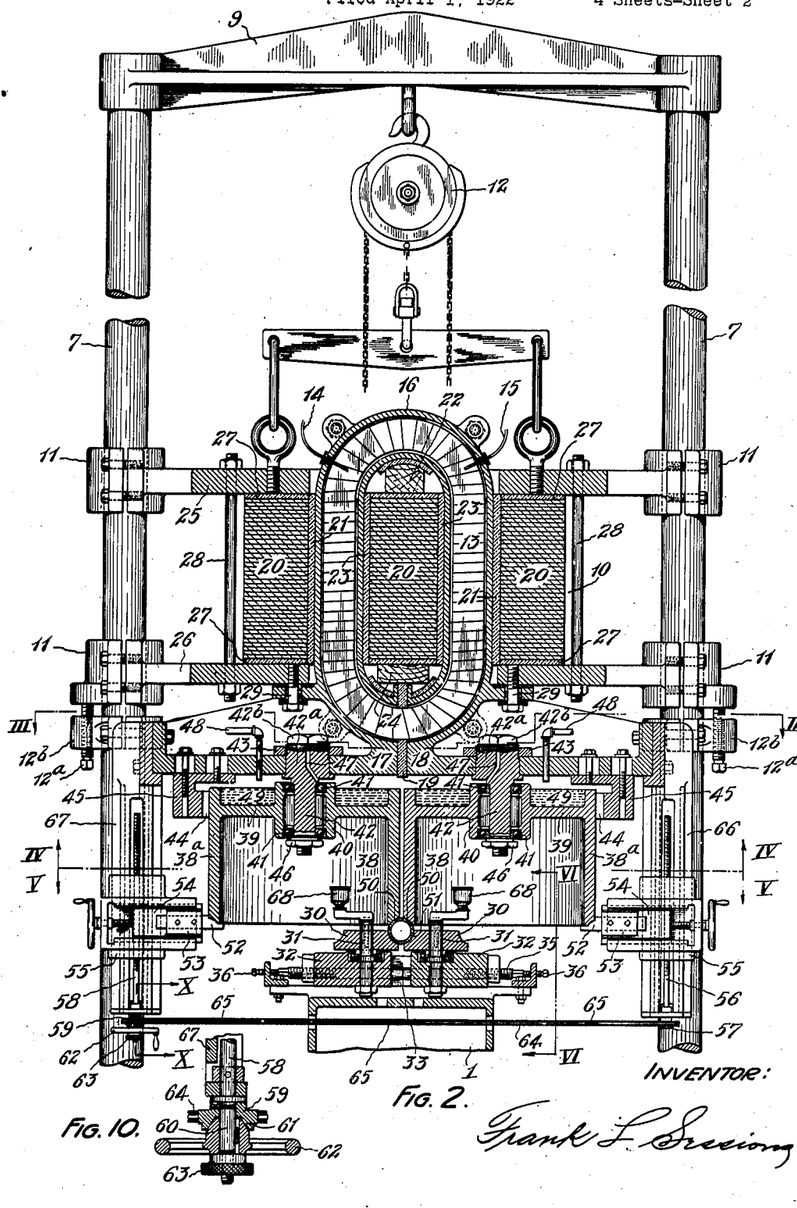
Fig. 2 is a section on line II—II of Fig. 1.
Fig. 10 is a section on line X—X of Fig. 2.
Figure 3:
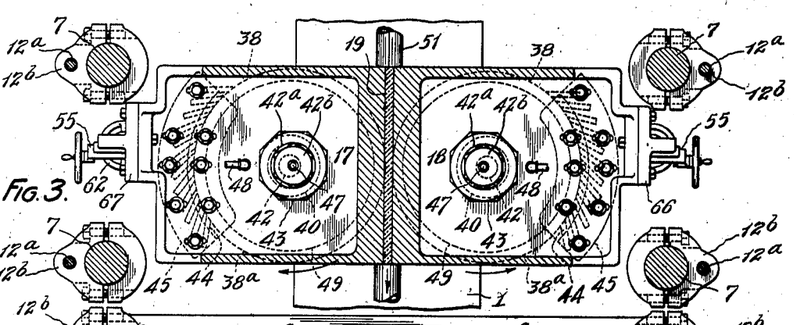
Fig. 3 is a section on line III—III of Fig. 2.
Figure 4:
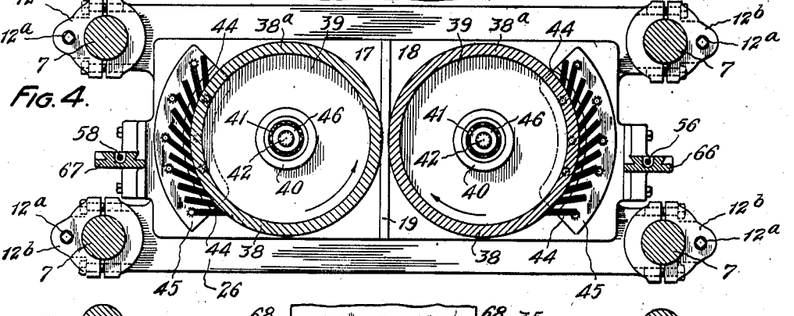
Fig. 4 is a section on line IV—IV of Fig. 2 looking upward.
Figures 5, 6, 7, 8:
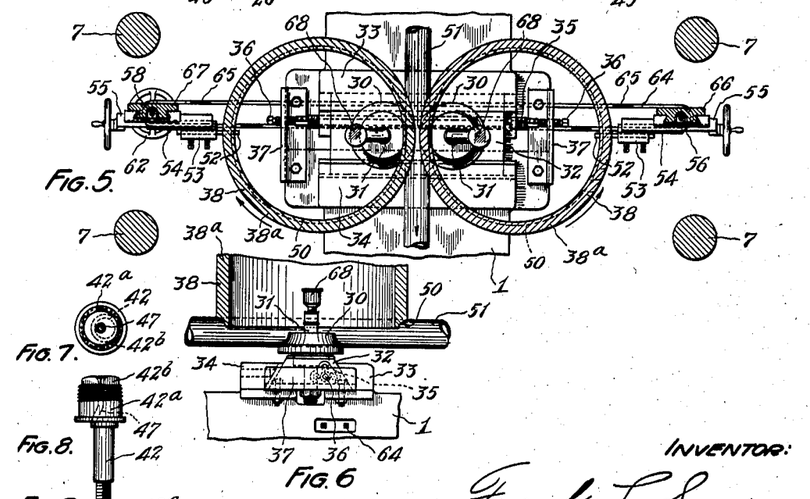
Fig. 5 is a section on line V—V of Fig. 2 looking downward.
Fig. 6 is a section on line VI—VI of Fig. 2.
Fig. 7, Fig. 8 and Fig. 9 are respectively a top plan, a side elevation and a bottom plan of a stud or trunnion employed for supporting and adjusting the electrodes.
Figure 9:
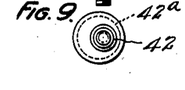

Figs. 3, 4 and 5 are respectively sections on lines III—III, IV—IV, and V—V and clearly show the construction of my machine. Fig. 6 is a section on line VI—VI of Fig. 2 showing the relation of the side pressure rolls to the electrodes and to the tube being welded. Provision for lubricating the side pressure rolls may be made by suitable apertures in the studs, 31, and oil or grease cups, 68 suitably mounted upon the studs.

Figure 1:
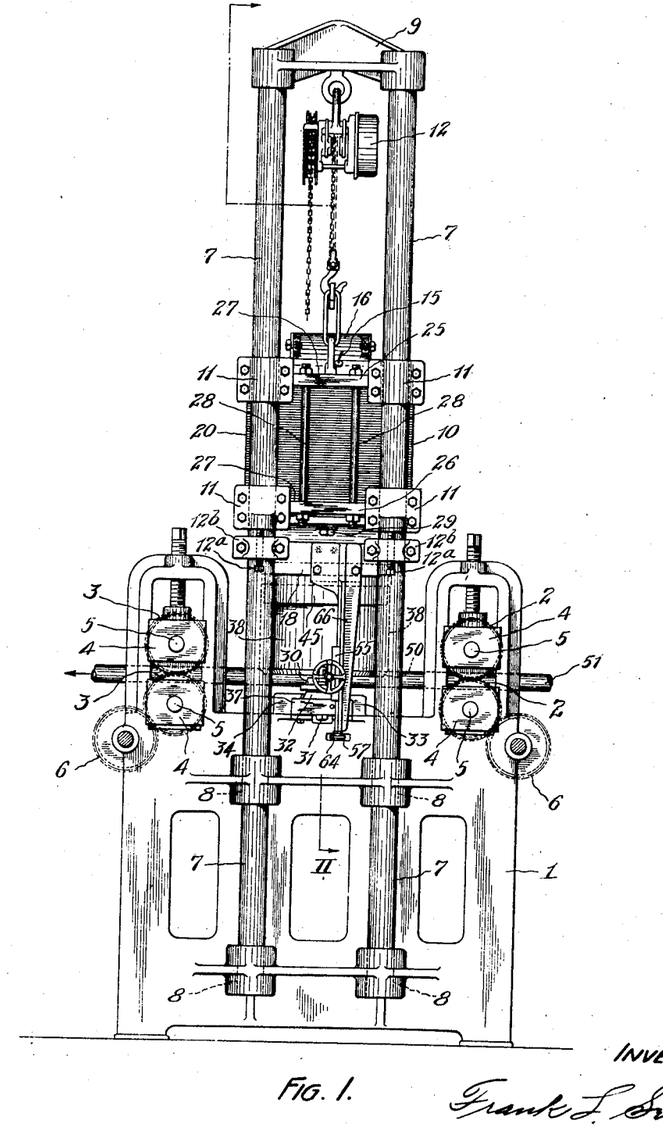
Fig. 1 is a side elevation of a machine embodying my invention.
Figure 11:
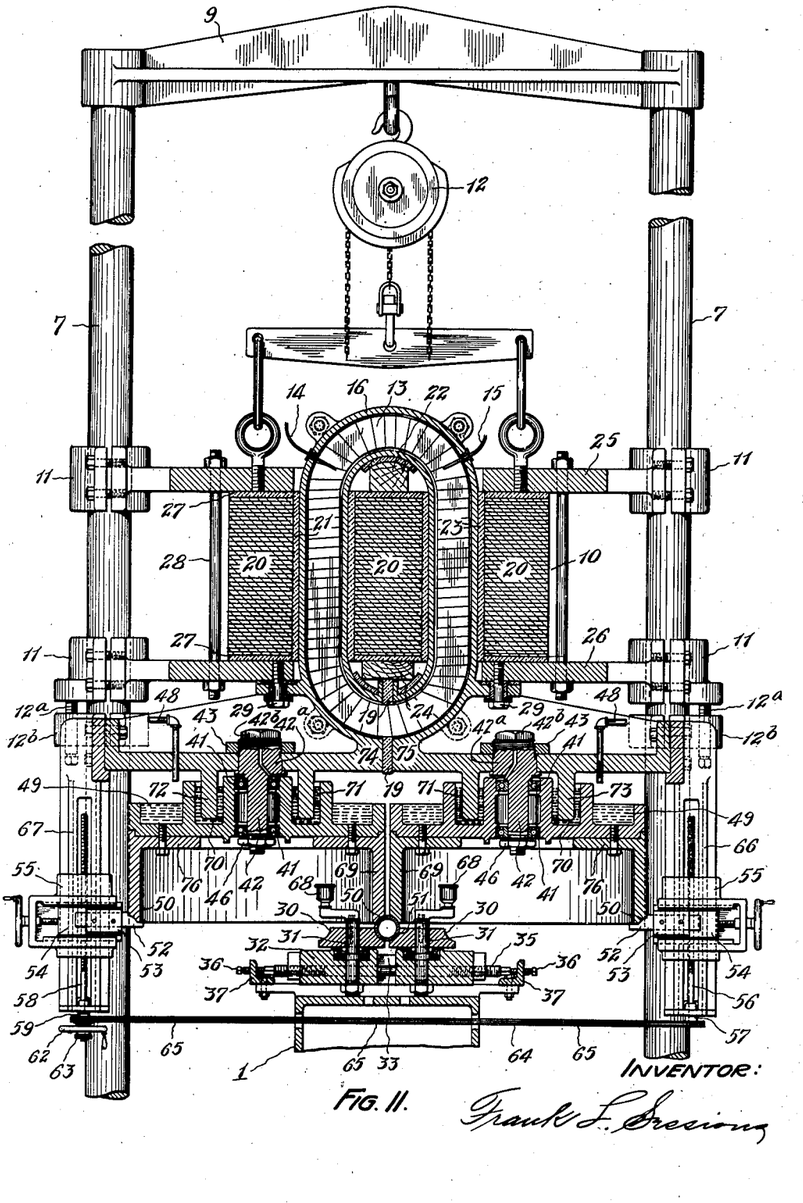
Fig. 11 is a section through a machine having a modified form of current collecting device, the section being taken on a plane similarly located to that of line II—II of Fig. 1.

Fig. 11 is a section through a machine having a modified form of current collecting device the section being taken on a plane similar to that of line II—II of Fig. 1. In this modification the electrode rolls, 69, are provided with annular recesses, 70, forming mercury cups containing mercury shown at 71. Annular flanges, 72 and 73 projecting downwardly from the transformer secondary terminals, 74 and 75, respectively, are immersed in the mercury in the cups, 70, and current is conducted from the transformer terminals to the electrodes through these mercury contacts. In other respects the machine shown in Fig. 11 is similar to that shown in the other views of the drawings.

For the production of tubes of different diameters it is necessary to provide electrodes and supporting and side pressure rolls having grooves of proper dimensions for the tubes being welded. When it is desired to change from welding on size tube to the welding of another size, both the electrodes and the supporting and pressure rolls must be changed. By the use of my invention the change of these parts can be effected quickly and easily. The form of my electrodes makes it possible to provide a larger amount of wearing material than it is possible to provide in any other type of electrode used in seam-welding machines known to me. This is a decided advantage as electrodes are generally made of copper and are difficult and costly to produce.

One of the principal advantages of the electrode construction of this invention is derived from the feature that the effective diameter of the electrode remains constant throughout the useful life thereof so that the electrodes may if desired be positively driven by means other than the frictional contact between said electrodes and the work. In welding very thin walled tubing it is desirable to positively drive the electrodes by means other than the frictional contact with the tube as it has been found that the tube tends to buckle if too much end thrust is put upon it as by the work of rotating the electrodes.

In the case of the disk form of electrodes heretofore in common use, the wear upon the electrodes constantly reduces their effective diameter so that it is impossible to positively rotate them so that their peripheral speed harmonizes with the speed of travel of the tube. The present invention provides electrodes of such construction that they may be positively driven as the diameters of their contacting surfaces remain constant regardless of wear during use.

It will be apparent to those skilled in the art that the wearing portion of my electrodes may be made separate from the spoke and hub portion and may be detachably secured thereto as shown at 76 in Fig. 11. If so made the hub and spoke portion need not be discarded when the tube contacting portion is worn out but the latter may be replaced by other tube contacting portions suitable for welding either the same or another size of tube.

Having thus described my invention I claim:—

1. A tube welding machine having a welding throat the cross section of which is a substantially closed curve formed by complemental grooves in the surfaces of a plurality of rolls including two electrode rolls, said electrode rolls having a tubular or open drum shape, and each provided with a welding contact groove on an edge, the grooves in the two rolls constituting a part of the welding throat, and means for feeding a tube through said welding throat.

2. In a tube welding machine, tube supporting rolls and a pair of revoluble electrodes, said tube supporting rolls and said electrodes having a welding throat formed by complemental grooves in the edges of said rolls and said electrodes respectively, said electrodes comprising a pair of open-ended, drum-shaped cylinders of circular cross section having their axes parallel and being arranged to be advanced along said axes, the edges of said cylinders constituting the wearing surfaces and being adapted to contact with a tube passing through the welding throat and means for causing a tube to pass through said welding throat.

3. In a tube welding machine, tube supporting rolls and a pair of revoluble electrodes, said tube supporting rolls and said electrodes having a welding throat formed by complemental grooves in the edges of said rolls and said electrodes respectively, said electrodes comprising a pair of cylinders of circular cross section having their axes parallel, the edges of said cylinders being adapted to contact with a tube passing through the welding throat, means for causing a tube to pass through said welding throat, and means for varying the distance between said electrodes.

4. In a tube welding machine, a pair of revoluble open-ended cylindrical electrodes, means to advance said electrodes along their axes, the edges of the open ends of said electrodes being adapted to make contact with the tube being welded, and an electric welding circuit, said electrodes being included in said circuit.

5. In a tube welding machine, an alternating current transformer, a pair of revoluble, open-ended cylindrical electrodes spaced apart and supported on said transformer, one of said electrodes being supported on one and the other of said electrodes being supported on the other of the secondary terminals of said transformer, said electrodes being arranged to be advanced along their axes, and the peripheral edges of said open ends being adapted to make contact with a tube.

6. In a tube welding machine, an alternating current transformer, a pair of vertical-axis, cylindrical electrodes supported by the secondary terminals thereof, one of said electrodes being supported by one and the other of said electrodes being supported by the other of said terminals, and means for varying the distance between said electrodes.

7. In a tube welding machine, a pair of edge contact vertical axis electrodes adapted to make contact with the tube being welded, a transformer mounted above said electrodes, and an electric welding circuit, said electrodes being supported in the extremities of said circuit.

8. In a tube welding machine, an alternating current transformer, a pair of revoluble, cylindrical electrodes of annular cross section supported thereby, one of said electrodes being electrically connected to one terminal and the other of said electrodes being electrically connected to the other terminal of the secondary of said transformer, and means for varying the distance between said electrodes.

9. In a welding machine, an electric welding circuit, a pair of revoluble, open-ended, drum electrodes, one of said electrodes being electrically connected to one terminal and the other to the other terminal of said circuit, said electrodes being adapted to make contact with the work at their open-end edges.

10. In an electric welding machine, an alternating current transformer, a pair of cylindrical electrodes supported thereby, said electrodes having their axes parallel, said electrodes being electrically connected to the secondary of said transformer, one to one terminal and the other to the other terminal thereof, means for varying the distance between said electrodes, and means for directing a cooling fluid upon said electrodes.

11. In an electric butt welding machine adapted to progressively weld a seam cleft in metal, a pair of revoluble independent vertical axis electrodes of circular cross section adapted to make edge contact with the metal on opposite sides of the seam cleft, said electrodes being disposed on the same side of the work, means for moving said electrodes towards and from the work, a pair of scraping tools located out of the plane of the seam cleft each respectively adapted to bear against the contacting surface of one of said electrodes and means for feeding said tools in a direction parallel to the axes of the electrodes.

12. In an electric butt tube welding machine, tube supporting means, a pair of revoluble, independent vertical-axis, cylindrical electrodes adapted to make end contact with the work, said tube supporting means and said electrodes having complemental grooves forming a welding throat transverse to the tube to be welded, an electrode scraping tool located out of the plane of the seam cleft in contact with one of said electrodes, and means for feeding said tool in a direction parallel to the axis of the electrode, said tool being supported by means electrically connected with said electrode.

13. In an electric butt tube welding machine, an electric circuit, a pair of independent revoluble, cylindrical open-end wall containing electrodes electrically connected to the terminals thereof, one of said electrodes being in electrical connection with one terminal and the other of said electrodes being in electrical connection with the other terminal of said circuit, said electrodes being adapted to make end contact upon opposite sides of the tube seam cleft, and a pair of electrode-scraping tools located out of the plane of the seam cleft, one in contact with one and the other in contact with the other of said electrodes adapted to scrape the respective, work-contacting surfaces thereof, and means for feeding said tools in a direction parallel to the axes of the electrodes, each of said tools being supported by means in electrical connection with that terminal of said circuit to which the electrode with which said tool contacts is electrically connected.

14. In an electric tube welding machine, an electric circuit, a pair of revoluble electrodes electrically connected to the terminals of said circuit, one of said electrodes being in electrical connection with one terminal and the other of said electrodes being in electrical connection with the other terminal of said circuit, a pair of electrode-scraping tools, one in contact with one and the other in contact with the other of said electrodes. adapted to scrape the respective, work-contacting surfaces thereof, each of said tools being supported by means in electrical connection with that terminal of said circuit to which the electrode with which said tool contacts is electrically connected, and means for simultaneously adjusting the positions of said tools relative to said electrodes.

15. In an electric tube welding machine, an electric circuit, a pair of revoluble electrodes electrically connected to the terminals of said circuit, one of said electrodes being in electrical connection with one terminal and the other of said electrodes being in electrical connection with the other terminal of said circuit, a pair of electrode-scraping tools, one in contact with one and the other in contact with the other of said electrodes adapted to scrape the respective, work-contacting surfaces thereof, each of said tools being supported by means in electrical connection with that terminal of said circuit to which the electrode with which said tool contacts is electrically connected, feeding means for separately adjusting the positions of said tools relative to said electrodes, and means whereby said feeding means may be simultaneously adjusted.

16. In an electric tube welding machine, an electric circuit, a pair of revoluble electrodes electrically connected to the terminals of said circuit, one of said electrodes being in electrical connection with one terminal and the other of said electrodes being in electrical connection with the other terminal of said circuit, a pair of electrode-scraping tools, one in contact with one and the other in contact with the other of said electrodes adapted to scrape the respective work-contacting surfaces thereof, feeding means for each tool for positioning it relatively to the electrode with which it is in contact, and detachable means connecting said feeding means whereby said feeding means may be operated either simultaneously or independently.

17. In an electric tube welding machine, an alternating current transformer having its secondary terminals disposed above the tube to be welded, a pair of revoluble, cylindrical electrodes having their axes vertical, a pair of electrode bearing studs respectively secured in apertures in said terminals, said electrodes being respectively supported by bearings on said studs the portion of one of said studs carrying a bearing being eccentric to the portion of said stud in the aperture in which it is secured whereby the distance between said electrodes may be varied by turning said stud in said aperture and means for securing said stud in adjusted position.

18. In an electric tube welding machine, an electric circuit, a pair of revoluble drum-shaped electrodes, current collecting means connecting each of said electrodes respectively with one of the terminals of said circuit, one of said electrodes being adjustable for varying the distance between said electrodes, each of said electrodes being adapted to make contact at the edge of its drum with the tube being welded.

19. In an electric tube welding machine, means for supporting a tube and for moving it longitudinally of itself, an alternating current transformer supported above said tube, a pair of revoluble cylindrical electrodes adapted to make contact with said tube and to rotate in bearings supported by said transformer, current collecting means connecting said electrodes respectively with the opposite terminals of said transformer and means for varying the distance between said electrodes.

20. In an electric tube welding machine, an electric circuit, a pair of parallel, revoluble, drum-shaped edge-contacting electrodes, and current collecting means connecting each of said electrodes respectively with one of the terminals of said circuit.

21. In an electric tube welding machine, an electric circuit, a pair of parallel, vertical-axis, revoluble drum-shaped, edge-contacting electrodes, current collecting means connecting each of said electrodes respectively with one of the terminals of said circuit, and means for varying the distance between said electrodes.

22. In an electric tube welding machine, an electric circuit, means for supporting the tube to be welded, a pair of parallel, vertical axis, revoluble drum-shaped, edge-contacting electrodes supported above the tube to be welded, current collecting means connecting each of said electrodes respectively with one of the terminals of said circuit, and a pair of electrode scraping tools adapted to scrape the work contacting surfaces of said electrodes.

23. In a welding machine for welding a seam cleft in the work, an electric welding circuit, a pair of revoluble electrodes of annular cross section disposed upon the same side of the work but upon opposite sides of the seam cleft, each of said electrodes having its outer surface generated by a straight line revolved about the axis of said electrode, the surfaces of said electrodes being presented toward each other in the plane of the welding throat, said electrodes being so disposed that the respective generating lines of said surfaces are parallel in the plane of the welding throat where said surfaces are presented towards each other.

24. A welding machine comprising a pair of cylindrical electrodes adjustable longitudinally of their axes relative to the work, for the purpose specified.

25. A welding machine comprising electrodes having a constant effective diameter regardless of wear during use, for the purpose specified.

26. In a tube butt welding machine, an alternating current transformer, a pair of independent open-drum shaped electrodes supported by the secondary terminals thereof, one of said electrodes being supported by one and the other of said electrodes being supported by the other of said terminals, and means for varying the distance between said electrodes.

27. A butt welding machine comprising a pair of independent open cylindrical electrodes, said electrodes being adapted to make open end contact with the work being welded.

28. A butt welding machine comprising a pair of spaced apart independent open cylindrical electrodes, said electrodes having their axes parallel.

29. In a tube butt welding machine, an alternating current transformer, a pair of independent open-drum shaped electrodes supported by the secondary terminals thereof, one of said electrodes being supported by one and the other of said electrodes being supported by the other of said terminals, the electrodes making open edge contact with the tube, the sides of the electrodes at the point of contact having their surfaces in parallel planes on opposite sides of the plane through the axis of the welding throat, and means for varying the distance between said electrodes.

30. In a tube welding machine, an electric circuit, and a pair of drum-shaped electrodes connected to the respective terminals thereof, adapted to make edge contact with the tube upon respectively opposite sides of the seam-cleft, and means for moving said electrodes towards and from said tube parallel to the axes of said electrodes.

31. In a tube welding machine, an electric circuit, and a pair of drum shaped electrodes connected to the respective terminals thereof, adapted to make edge contact with the tube upon respectively opposite sides of the seam-cleft, and means for advancing said electrodes towards the tube in a direction parallel to the plane which includes the seam-cleft and the axis of the tube.

32. In a welding machine, a pair of cylindrical electrodes adapted to be moved longitudinally of their axes towards and from the work, said electrodes having their axes parallel and spaced apart in a plane transverse to the seam being welded.

33. In a welding machine, a pair of cylindrical electrodes adapted to be moved longitudinally of their axes towards and from the work, said electrodes having their axes parallel and spaced apart in a plane transverse to the seam being welded, and means for varying the distance between said electrodes.

34. In a tube welding machine, an alternating current transformer, a pair of revoluble electrodes connected to the secondary terminals thereof, one of said electrodes being connected to one and the other of said electrodes being connected to the other of said terminals, the surfaces of said electrodes being parallel in a plane transverse to the tube being welded.

35. In a tube welding machine, a source of electric current supply, a pair of revoluble electrodes connected respectively to the opposite terminals of said source of current supply, means for supporting said electrodes for rotation about their axes, the outer surface of each of said electrodes being generated by a straight line revolving about the axis of the electrode, the surface of one electrode being parallel to the surface of the other electrode in the plane where they approach closest together.

36. In a tube welding machine, an edge contact vertical axis electrode adapted to make contact with a tube being welded, a transformer mounted above said electrode, an electric circuit, said electrode being included in said circuit, and said electrode having a liquid retaining annular recess on its upper surface.

37. A butt-welding machine for metal tubing having in combination a pair of separate, horizontally positioned electrode rolls adapted to bear upon opposite sides of the seam-line of the tube stock and to have peripheral contact with said tube stock only, and tube supporting means, said electrode rolls and tube supporting means being freely spaced from each other and co-operating to complete the welding throat for said tube stock.

38. A butt welding machine for metal tubing having in combination a pair of separate horizontally positioned electrode rolls adapted to bear upon opposite sides of the seam-line of the tube stock and to have peripheral contact with said tube stock only, and adjustable supporting means, said electrode rolls and supporting means being each freely spaced from the other and co-operating to complete the welding throat for said tube stock.

39. A butt-welding machine for metal tubing having in combination a pair of separate horizontally positioned electrode rolls adapted to bear upon opposite sides of the seam-cleft of the tube stock and to have peripheral contact with said tube stock only, thrust bearings adjacent said electrode rolls and adjustable supporting means for applying pressure to said stock and against said thrust bearings, said electrode rolls and said supporting means being freely spaced from each other and co-operating to complete the welding throat for said tube stock.

40. A butt-welding machine for metal tubing having in combination a pair of separate horizontally positioned electrode rolls adapted to bear upon opposite sides of the seam-line of the tube stock and to have peripheral contact with said tube stock only, thrust bearings adapted to resist the upward pressure of said electrode rolls, adjustable supporting means for applying pressure to said stock and against said thrust bearings, said electrode rolls and supporting means being freely spaced from each other and co-operating to complete the welding throat for said stock.

41. In an electric welding machine a support, a transformer mounted upon said support, a pair of horizontally positioned electrode rolls supported below said transformer and electrical connections between said transformer and said electrodes.

42. In an electric, seam-welding machine, a support, a transformer mounted upon said support, means for supporting the work below said transformer, a pair of horizontally positioned electrodes adapted to bear upon opposite sides of the seam-cleft of the work to be welded, said electrodes having fluid-conductor receptacles upon their top sides and said transformer having downwardly projecting terminals extending into said receptacles.

43. A butt-welding machine for metal tubing comprising means for supporting the tubing, a transformer supported above said tubing, a pair of horizontally disposed electrodes adapted to bear upon opposite sides of the seam-cleft of the tubing, means for conducting current from said transformer to said electrodes, and means for causing relative traversing movement of said electrodes and said tubing.

44. In an electric welding machine for progressively welding a seam-cleft in metal, a pair of revoluble, vertical axis electrodes adapted to bear upon the opposite sides of the seam-cleft, means for supporting the work to be welded, means for causing relative traversing movement of the electrodes and the work, a welding circuit, means for supporting the terminals of said circuit above said electrodes, said electrodes having fluid-conductor receptacles upon their top sides and said terminals having portions projecting downwardly into said receptacles.

45. In an electric welding machine, a support, a transformer mounted upon said support, and a pair of horizontally positioned electrode rolls supported below the transformer by circuit extremities of said transformer.

46. In an electric welding machine, a support, a transformer mounted upon said support, a pair of horizontally positioned electrode rolls supported below the transformer by circuit extremities of said transformer, and electrical contact means for making contact with the electrode rolls.

47. An electric welding machine comprising a support, a transformer adjustably mounted upon said support, a pair of horizontally positioned electrode rolls adjustably suspended from the transformer, and means to electrically connect the electrodes to the transformer.

48. An electric welding machine comprising a support, a transformer adjustably mounted upon said support, a pair of horizontally positioned electrode rolls adjustably suspended from the transformer, means to vary the distance between the electrode rolls, and means to electrically connect the electrodes to the transformer.

49. An electric welding machine comprising a support, a transformer adjustably mounted upon said support, a pair of horizontally positioned electrode rolls adjustably suspended from the transformer, means to vary the distance between the electrode rolls, means to cool the electrodes, and means to electrically connect the electrodes to the transformer.

50. An electric tube-welding machine comprising a support, tube supporting rolls, a transformer adjustably mounted upon said support and above the tube, a pair of horizontally position electrode rolls adjustably suspended from the transformer and arranged to exert a controlled pressure upon the tube, means to vary the distance between the electrodes, and means to electrically connect the electrodes to the transformer.

In testimony whereof I affix my signature.

FRANK L. SESSIONS.